(12) United States Patent
Meddes et al.

(10) Patent No.: US 9,267,362 B2
(45) Date of Patent: Feb. 23, 2016

(54) PERFORATORS

(75) Inventors: Russell Vaughan Meddes, Farnbourgh (GB); Michael John Hinton, Sevenoaks (GB)

(73) Assignee: QINETIQ LIMITED (GB)

( * ) Notice: Subject to any disclaimer, the term of this patent is extended or adjusted under 35 U.S.C. 154(b) by 646 days.

(21) Appl. No.: 10/574,998

(22) PCT Filed: Oct. 8, 2004

(86) PCT No.: PCT/GB2004/004332
§ 371 (c)(1),
(2), (4) Date: Apr. 7, 2006

(87) PCT Pub. No.: WO2005/035940
PCT Pub. Date: Apr. 21, 2005

(65) Prior Publication Data
US 2008/0230225 A1    Sep. 25, 2008

(30) Foreign Application Priority Data
Oct. 10, 2003 (GB) .................................. 0323673.4

(51) Int. Cl.
*E21B 43/11* (2006.01)
*E21B 43/117* (2006.01)
*E21B 43/116* (2006.01)

(52) U.S. Cl.
CPC ............... *E21B 43/117* (2013.01); *E21B 43/11* (2013.01); *E21B 43/116* (2013.01)

(58) Field of Classification Search
CPC ...... E21B 43/117; E21B 43/116; E21B 43/11
USPC ............. 166/297, 55.1, 299, 55, 63; 175/4.6; 102/313, 207, 312, 378, 306, 310
See application file for complete search history.

(56) References Cited

U.S. PATENT DOCUMENTS

| 4,756,371 | A | * | 7/1988 | Brieger .......................... 166/312 |
| 4,777,869 | A | * | 10/1988 | Dirkin et al. .................... 92/248 |
| 5,564,499 | A | * | 10/1996 | Willis et al. .................... 166/299 |
| 5,960,894 | A | | 10/1999 | Lilly et al. |

(Continued)

FOREIGN PATENT DOCUMENTS

| GB | 2 365 468 | 2/2002 |
| GB | 2 380 536 | 4/2003 |

(Continued)

OTHER PUBLICATIONS

Zhu Lihua, Explosive Materials, Periodical 4, pp. 29-34, date of publication Aug. 31, 1993.

(Continued)

*Primary Examiner* — Yong-Suk (Philip) Ro
(74) *Attorney, Agent, or Firm* — McDonnell Boehnen Hulbert & Berghoff LLP

(57) ABSTRACT

A carrier for at least one shaped charge, the carrier being disposable in use within an oil, gas, water or steam well bore. The carrier comprises a housing at least partially formed from a composite material which is non-frangible in normal use. The composite material component of the housing is arranged substantially to contain debris created within the carrier as a result of firing of the at least one shaped charge. The housing may be entirely of composite material or may comprise in inner metallic housing and an outer overwrap of composite material.

10 Claims, 3 Drawing Sheets

(56) References Cited

U.S. PATENT DOCUMENTS

| | | | |
|---|---|---|---|
| 6,082,450 A | 7/2000 | Haney et al. | |
| 6,422,148 B1* | 7/2002 | Xu et al. | 102/313 |
| 6,520,258 B1 | 2/2003 | Behrmann et al. | |
| 2003/0173460 A1* | 9/2003 | Chapman, Jr. | 244/123 |

FOREIGN PATENT DOCUMENTS

| WO | WO 01/04452 | 1/2001 |
|---|---|---|
| WO | WO 01/07860 | 2/2001 |

OTHER PUBLICATIONS

Zhu Lihua, Explosive Materials, Periodical 4, pp. 29-34, date of publication Aug. 31, 1993, English translation of Section 3.2 of the article is attached.

First Office Action issued in Chinese patent action serial No. 200480029554.9, issued by the Chinese Patent Office on Oct. 10, 2008.

* cited by examiner

PERFORATORS

FIELD OF THE INVENTION

The present invention relates to a gun or carrier for perforator charges used in perforating and fracturing well completions particularly, although not exclusively, oil, gas, water and steam wells.

BACKGROUND TO THE INVENTION

By far the most significant process in carrying out a completion in a cased well is that of providing a flow path between the production zone, also known as a formation, and the well bore. Typically, the creation of such a flow path is carried out using a perforator, with the resulting aperture in the casing and physical penetration into the formation via a cementing layer being commonly referred to as a perforation. Although mechanical perforating devices are known, almost overwhelmingly such perforations are formed using energetic materials e.g. high explosives. Energetic materials can also confer additional benefits in that may provide stimulation to the well in the sense that the shockwave passing into the formation can enhance the effectiveness of the perforation and produce increased flow from the formation. Typically, such a perforator will take the form of a shaped-charge. In the following, any reference to a perforator, unless otherwise qualified, should be taken to mean a shaped charge perforator.

A shaped charge is an energetic device made up of an axisymmetric case within which is inserted a liner. The liner provides one internal surface of a void, the remaining surfaces of the void being provided by the enclosure. The void is filled with a high explosive such as HMX, RDX, PYX or HNS which, when detonated, causes the liner material to collapse and be ejected from the casing in the form of a high velocity jet of material. It is this jet of material which impacts upon the well casing creating an aperture and then penetrates into the formation itself. Generally, a large number of perforations are required in a particular region of the casing proximate a formation. To this end, a so called gun is deployed into the casing by wireline, coiled tubing or indeed any other technique know to those skilled in the art. The gun is effectively a carrier for a plurality of perforators which may be of the same or differing output. The precise type of perforator, their number and the size of the gun are a matter generally decided upon by a completion engineer based on an analysis and/or assessment of the characteristics of the completion. Depending on the nature of the formation, the aim of the completion engineer may be either to obtain the largest possible aperture in the casing or to obtain the deepest possible penetration into the surrounding formation. Thus, in an unconsolidated formation, the former will be preferred whereas in a consolidated formation the latter will be desired. It will be appreciated that the nature of a formation may vary both from completion to completion and also within the extent of a particular completion.

Typically, the actual selection of the perforator charges, their number and arrangement within a gun and indeed the type of gun is left to the completion engineer. A particular constraint on the engineer and his selection of the charges is the carrier or gun used to convey the charges into the well. The carrier is a containment device which seeks to contain the explosive force to an extent necessary to protect the well casing from the effects of fragmentation. The carrier further acts as a barrier between the pressurised fluids in the well and the perforator charges. Almost universally, steel is used as the material of choice in the manufacture of carriers. Consequently, a carrier is heavy and difficult to handle.

The completion engineer will base his decision on an empirical approach born of experience and knowledge of the particular formation in which the completion is taking place. However, to assist the engineer in his selection there have been developed a range of tests and procedures for the characterisation of perforator performance. These tests and procedures have been developed by the industry via the American Petroleum Institute (API). In this regard, the API standard RP 19 B (formerly RP 43 $5^{th}$ Edition) currently available for download from www.api.org is used widely by the perforator community as indication of perforator performance. Manufacturers of perforators typically utilise this API standard marketing their products. The completion engineer is therefore able to select between products of different manufacturers for a perforator having the performance he believes is required for the particular job in hand. In making his selection, the engineer can be confident of the type of performance to expect from the perforator.

Nevertheless, despite the existence of these tests and procedures there is recognition that completion engineering remains at heart more art than science. It has been recognised by the inventors in respect of the invention set out herein, that the conservative nature of the current approach to completion has failed to bring about the change in the approach to completion engineering required to enhance and increase production from both straightforward and complex completions.

A further problem associated with perforator guns is that of debris remaining in the well after firing of the charges. One approach to this problem is to employ a gun casing or other carrier which is substantially destroyed upon firing of the perforator charges. Patent Application GB 2,365,468A (Sclumberger) discloses an arrangement in which the casing is formed of a compound material which is brittle under dynamic impact and hence designed to shatter upon firing of the charges; Patent Application GB 2,380, 536A (Schlumberger) discloses a gun jacket designed to be combustible upon firing of the charges; and U.S. Pat. No. 5,960,894 discloses a tube designed either to fragment or to combust in use and in either case to leave no large pieces of debris in the well.

Patent Application WO 01/07860A3 discloses apparatus and methods for reducing interference resulting from activation of perforator charges.

SUMMARY OF THE INVENTION

Thus in accordance with a first aspect of the present invention there is provided a carrier for at least one shaped charge, the carrier being disposable in use within a well bore, the carrier comprising a housing at least partially formed from a composite material, the composite material being non-frangible in normal use and the composite material being arranged substantially to contain debris created within the carrier as a result of firing of the at least one shaped charge.

In a preferred embodiment the carrier the housing comprises an inner housing which is at least partially encompassed by an outer composite material overwrap. Preferably the inner housing is substantially metallic in construction.

Preferably, the inner housing takes the form of a thin walled metal cylinder. Typically, a high strength steel will be employed. Advantageously, the metal cylinder will be of a thickness less than that employed in conventional carriers fabricated entirely of metal. Such a reduction in thickness can bring about a reduction brings about a weight saving. The provision of a composite material overwrap enhances the performance of the carrier. Conveniently, the physical characteristics of the composite material, by which is meant the particular selection of material and/or the structure of the composite material can be selected to match the requirements for the carrier. In particular, it is expected that axial and hoop properties of the overwrap composite material may be tuned independently to deal with the distribution in stresses occurring both during handling of the carrier and, of course, on detonation of the one or more perforators. Advantageously, the axial flexibility of the carrier may be tuned to facilitate easier transport of the carrier both into the well and through deviations therein. Preferably, the fibre tension of the composite material can be tuned to maximise containment of the explosive energy dissipated during firing of the one or more perforators to reduce the level of dilation. The firing or initiation of a perforator brings about a localised pressurisation/impulse which results in an expansion or dilation of the carrier. Excessive dilation of the carrier may result in the carrier becoming lodged within the well casing with obvious negative consequences. Consequently, the larger and/or more numerous charges may be utilised in a carrier than hitherto available in a convention carrier of equivalent dimensions.

In a preferred embodiment, the housing may be made entirely, or almost entirely, of a composite material.

The selection of the composite material, whether for the whole or part of the housing or for an overwrap, can be such that fragmentation of the composite material occurs only in the event of a pressurisation/impulse outside of the expected limits for the carrier or completion. In this case the composite material is, within its normal expected operating parameters, non-frangible in nature. Upon firing of the gun, the composite portion of the carrier therefore remains intact, thereby containing debris from firing of the shaped charges. Substantially all of the remains of the gun can therefore be retracted from the well after firing of the gun.

According to a further aspect of the present invention there is provided a perforating gun comprising a carrier in accordance with the present the invention.

According to a further aspect of the present invention there is provided a method of improving fluid outflow from a well borehole the method comprising the steps of: providing a perforating gun (or carrier for a perforating gun) according to the present invention; positioning the perforating gun in the well borehole; perforating the borehole by firing the perforating gun; retrieving debris resulting from the step of perforating by recovering the carrier of the perforating gun, the carrier containing debris resulting from the firing.

Advantageously, subsequent recovery of fluids (e.g. hydrocarbons (oil or gas), water, or steam) from the well is improved since the carrier affords improved debris containment and retraction from the well. As a result less debris is left in the well to impede fluid outflow, and less debris is available in the well to be carried in the fluid outflow which may cause consequent blockage and corrosion of well-head piping and equipment.

BRIEF DESCRIPTION OF THE FIGURES

In order to assist in understanding the invention, a number of embodiments thereof will now be described, by way of example and with reference to the accompanying drawings, in which.

DETAILED DESCRIPTION OF THE INVENTION

In the following, references to a carrier or gun are intended to be interchangeable.

Figure 1:
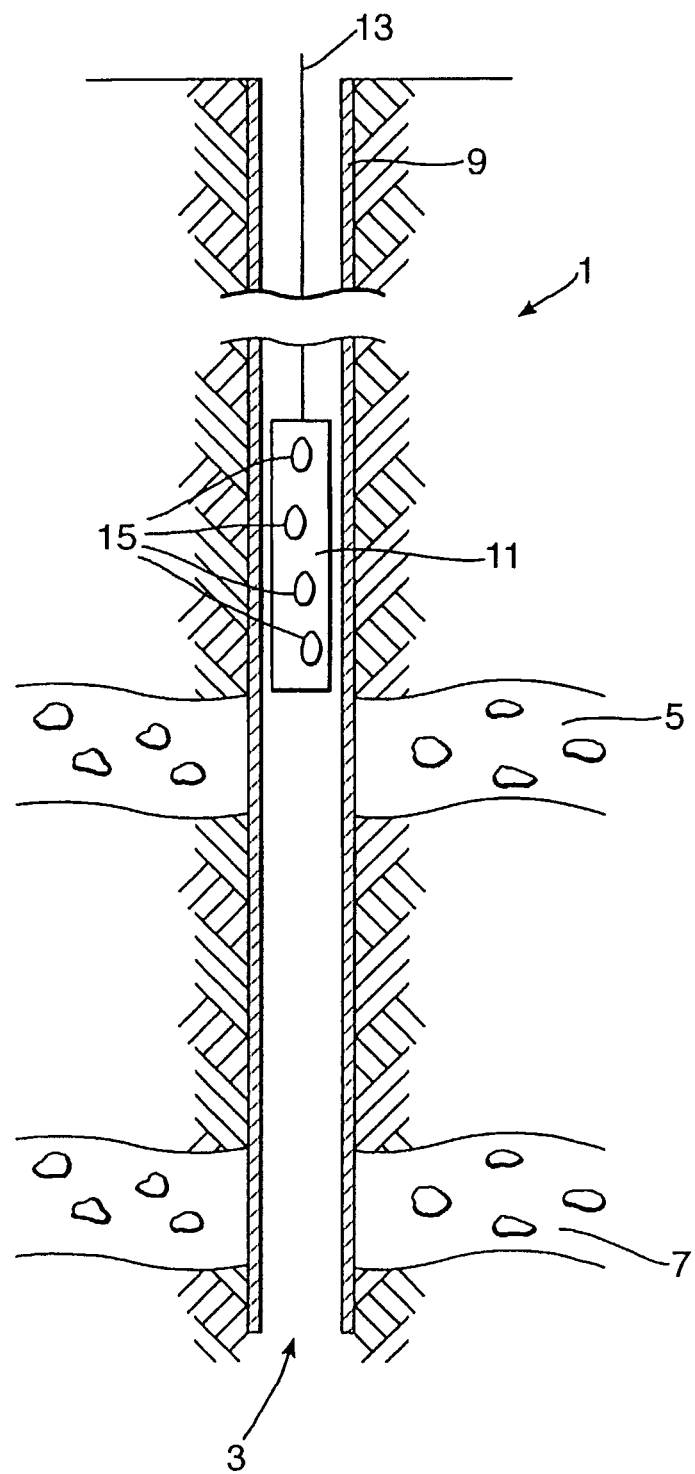
FIG. 1 is a sectional view of a completion in which a gun or carrier according to an embodiment of the invention is shown.

With reference to FIG. 1, there is shown a stage in the completion of a well 1 in which, the well bore 3 has been drilled into a pair of producing zones 5,7 in, respectively, unconsolidated and consolidated formations. A steel tubular or casing of steel is cemented within the bore 3 and in order to provide a flow path from the production zones 5,7 into the eventual annulus that will be formed between the casing 9 and production tubing (not shown) which will be present within the completed well, it is necessary to perforate the casing 9. In order to form perforations in the casing 9, a gun 11 is lowered into the casing on a wireline, slickline or coiled tubing 13, as appropriate.

Figure 2:
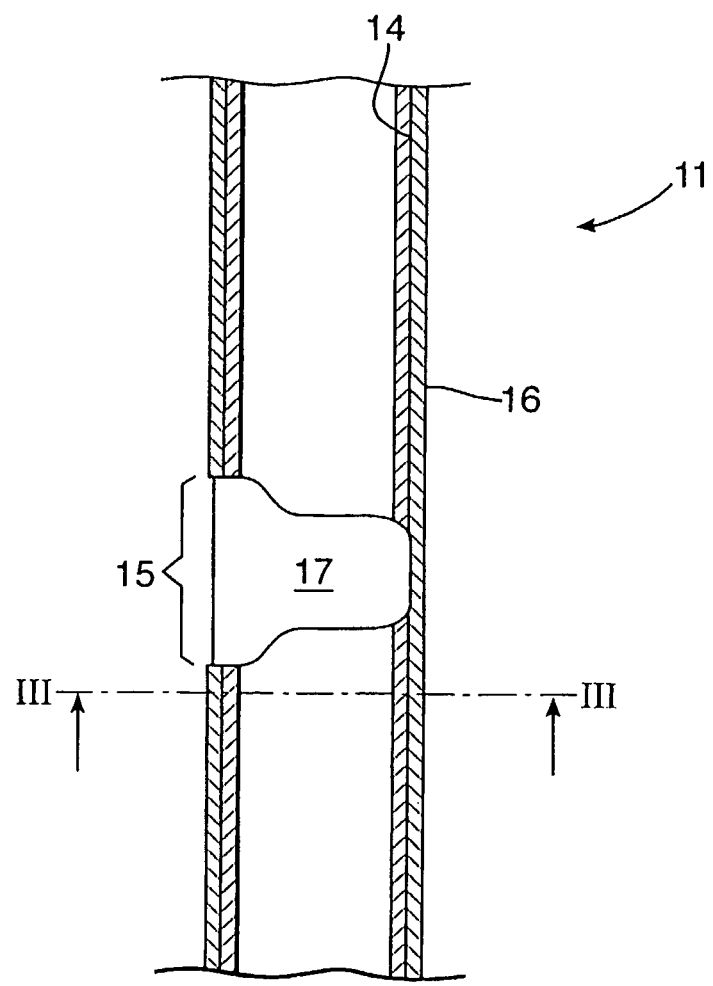
FIG. 2 is a scrap sectional side view of the gun or carrier according to a first aspect of the invention.
Figure 3:
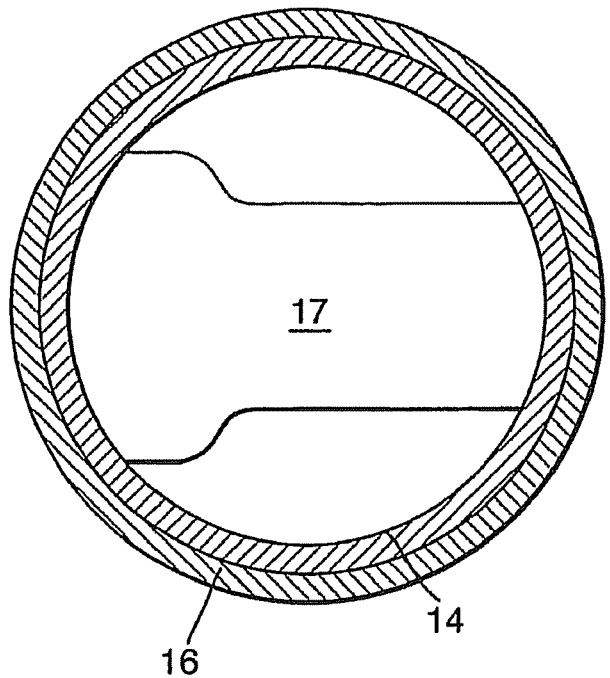
FIG. 3 is a cross-sectional view on the line III-III of FIG. 2 of the carrier of FIG. 2.

As is shown in more detail in FIGS. 2 and 3, the gun 11 comprises an inner cylindrical tube 14 of steel in which are formed ports 15 through which perforator charges 17 received within the body of the gun 11 are fired. Encompassing the inner cylindrical tube 14 is an overwrap of composite material 16. The overwrap 16 effectively forms an outer cylindrical tube in which ports 15 are provided to correspond with those formed in the inner cylindrical tube 14.

The overall diameter of the gun 11 is selected to be a close but not interference fit with the casing 9 as shown in FIG. 1. Thus, the gun 11 is effectively self-centring within the casing 9. By having the gun self-centred within the casing 9, there is little or minimal variation in the standoff distance between the charges 17 and the casing 9. Any significant variation in the standoff distance may have a detrimental effect on the consistency of performance of the perforators 17.

In use, the gun 11 is lowered into the well 1 to a depth where it is adjacent the production zone 5,7. It may be that the extent of the production zone 5,7 exceeds the length of a gun 1 in which case a string of guns may be lowered and/or a number of operations may be required to fully perforate the casing in the region of the zone. Furthermore, it may be that where the formation is relative unconsolidated, the perforators 17 may be intended to provide a larger aperture in the casing 9 at the expense of depth of penetration into the formation. Conversely, a small aperture may be formed in the casing 9 where a greater depth penetration is required, such as, for example, in highly consolidated sediment. In either case, the completion engineer will attempt to select the most appropriate charges for the particular perforations required in the casing 9.

Figure 4:
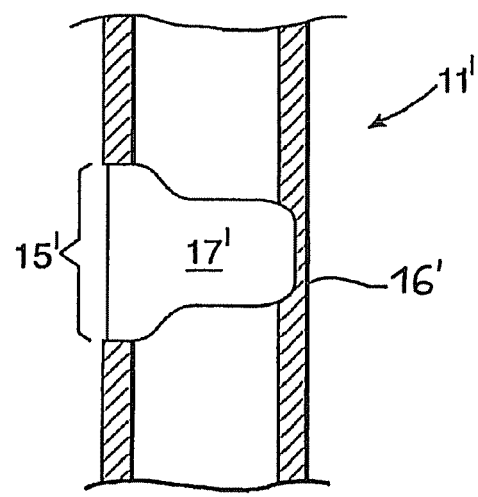
FIG. 4 is a scrap sectional side view of the gun or carrier of a further aspect of the invention.

Turning to FIG. 4, there is shown a further embodiment in which the entire gun 11' is formed as a thin walled cylinder of composite material 16'. The cylinder is formed with ports 15' and suitable attachment points within the body of the cylinder for receiving perforator charge 17'.

The composite material used either as an overwrap for a steel cylinder 14 or in fabricating an entire gun 11 is selected to add additional strength amongst other improvements to the physical performance of the gun. Thus, a composite material may be formed from a reinforced polymeric material. Some non-limiting examples of reinforcement include providing reinforcement by a preform or in a variant of the embodiment using individual rovings.

The preform may be fabricated by hand lay up, filament winding, compression moulding or braiding using a binder to maintain the desired profile, to give just four examples. A matrix into which a solid material loading is added, can include one or more plastics material. The plastics material will be selected from types including, but not limited to one or more of the following, namely thermosets, thermoplastics and elastomers, It will be appreciated that the selection of a plastics material is, to a great part, made on the basis of its performance at the temperatures likely to obtain with a completion. In some circumstances, a gun 11 may remain within a casing 9 for extended periods before it is used. Thus the plastics material may need to be selected to withstand not only raised temperature, perhaps 200° C. but to maintain performance at elevated temperature for a significant period of days or even weeks.

It has been determined that of the class of thermoplastics, materials such as polystyrene, polymers of olefins containing 2 to 10 carbon atoms such as polyethylene and polypropylene are suitable for selection up to temperatures of around 200° C. Around and above this temperature, plastics material having higher meting points such as polyethersulfone (PES), polyoxymethylene (POM) and PK for example, can be utilised.

Into the matrix described above may be added a filler material. The filler material may include one or more preferably metallic materials. For example, a metallic material may be selected from the following non-exclusive list, namely copper, aluminium, iron, tungsten and alloys thereof. Additionally or alternatively, a non-metallic material or materials may be selected. Such materials include, but are not limited to inorganic or organic materials such as borides, carbides, oxides, nitrides of metals and glasses, especially refractory metals.

As has been noted previously, it has been found that fragmentation of prior art guns brought about by the explosive effect of one or more perforators 17 can cause collateral damage to the structures surrounding the gun including the formation 5,7. Fragments of such a prior art gun can be carried by well fluids into valves and such like where they can lodge and/or initiate corrosion, particularly where zinc is used in the manufacture of the gun. It is therefore proposed that in a variant of the second described embodiment, the composite material is selected with a view to the gun fragmenting into debris of insufficient size and therefore energy to cause appreciable damage to surrounding structure or indeed well equipment in the event of an excess of energy being released by detonation of the perforators. The selection of a friable composite material can be such that this fragmentation occurs only in the event of an overloading of the gun or as a deliberate result of the firing of the perforators. In the later case, the gun may be referred to as a one-shot gun and may further incorporate perforators which themselves are intended to form fragments on detonation which do not cause appreciable damage to surrounding structures.

It will be appreciated by those skilled in the art that a manufacturing method suitable for the composite material elements of the embodiments of the gun described above, could be selected from the following non-exclusive list. Thus, a matrix utilising a particulate reinforcement is formed by preparing a mixture of these two components and compounding them under vacuum. A gun or overwrap of compounded thermoplastic and particulate materials can be formed using injection or compression moulding. Injection moulding is believed to be particularly suitable for a gun using a dry preform. Compression moulding may be effective for a gun or overwrap having a preform containing thermoplastic fibres co-mingled with the reinforcement.

Where a gun or carrier is to be formed by filament winding, it is suggested that this might provide excellent strength and dimensional accuracy.

The invention claimed is:

1. A method of improving fluid outflow from a well borehole the method comprising the steps of:
    providing the perforating gun comprising a carrier for at least one shaped charge, the carrier being disposable in use within a well bore, the carrier comprising a housing at least partially formed from a composite material, the composite material comprising a polymeric reinforced material being non-frangible in normal use and the composite material being arranged substantially to contain debris created within the carrier as a result of firing the at least one shaped charge;
    positioning the perforating gun in the well borehole;
    perforating the borehole by firing the perforating gun such that upon firing the gun, the composite portion of the carrier therefore remains intact thereby containing debris from firing the shaped charge;
    retrieving debris resulting from the step of perforating by recovering the carrier of the perforating gun, whereby the carrier contains substantially all of the debris resulting from the firing.

2. The method according to claim 1 in which the fluid is one or more of hydrocarbons, water, and steam.

3. The method according to claim 1 in which the housing comprises an inner housing which is at least partially encompassed by an outer composite material overwrap in which the outer composite material is a reinforced polymer material or a loaded polymer matrix.

4. The method according to claim 3 in which the inner housing is substantially of metal.

5. The method according to claim 1, wherein the housing comprises a thin-walled cylinder.

6. The method according to claim 1, in which the carrier has at least one port formed therein.

7. The method according to claim 1, in which a plurality of ports are distributed along the longitudinal extent of the carrier.

8. The method according to claim 1, in which the composite material includes longitudinally arranged fibres.

9. The method according to claim 1, in which the composite material includes circumferentially arranged fibres.

10. The method carrier according to claim 9 in which said circumferentially arranged fibres have respective predetermined tensions.

* * * * *